May 24, 1927.
L. E. LA BRIE
1,630,061
BRAKE
Filed Oct. 7, 1925
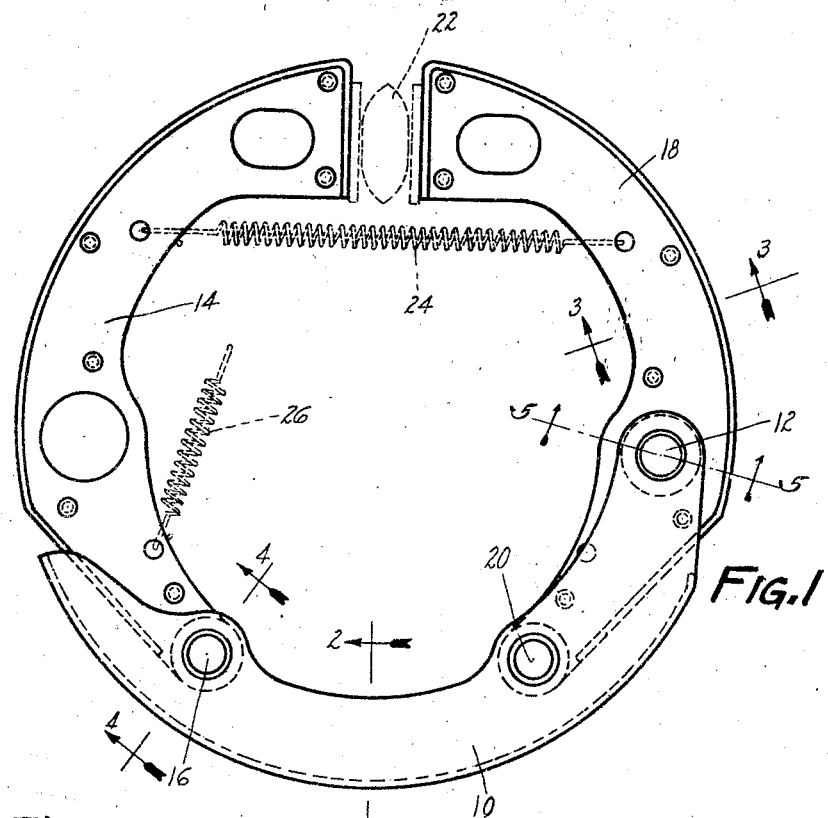
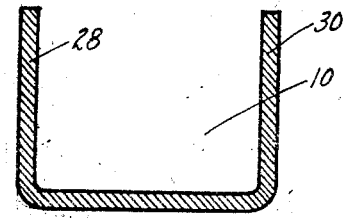
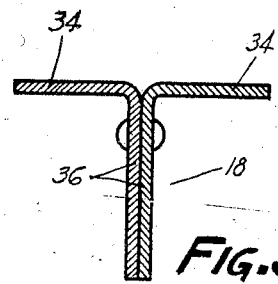
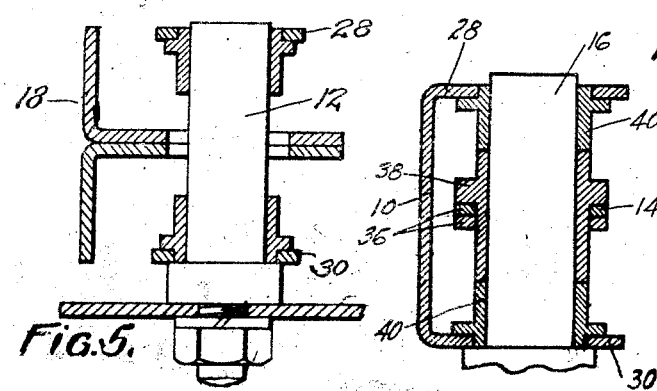
INVENTOR
LUDGER E. LaBRIE
BY
ATTORNEY Patented May 24, 1927.

1,630,061

UNITED STATES PATENT OFFICE.

LUDGER ELIZE LA BRIE, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed October 7, 1925. Serial No. 60,991.

This invention relates to brakes, and is illustrated as embodied in a three-shoe brake of the "Bendix" type. An object of the invention is to provide a novel shoe arrangement permitting the use of simple and inexpensive shoes without sacrificing any of the advantages of this type of brake.

It is highly desirable in such a brake to "cross-anchor" or overlap two of the shoes, and preferably also to have the central shoe overhang the servo shoe by which it is operated. I accomplish this in a novel manner, permitting the use of inexpensive pressed-metal shoes if desired, by forming the central shoe of channel form (at least at its ends), so that the side flanges may straddle and overlap the adjacent shoe or shoes.

In the illustrated brake the end shoes are T-shaped in cross-section and are pivoted to the side flanges of the central shoe, which is anchored at one end between the ends of the reverse end shoe.

The above and other objects and features of the invention, including various novel combinations of parts and desirable particular constructions, will be apparent from the following description of one illustrative embodiment shown in the accompanying drawing, in which:
Fig. 1 is a side elevation of the shoes in assembled relation;

Fig. 2 is a section through the central shoe on the line 2—2 of Fig. 1;

Fig. 3 is a section through one end shoe on the line 3—3 of Fig. 1;

Fig. 4 is a section through one of the pivot connections, on the line 4—4 of Fig. 1; and Fig. 5 is a partial section on the line 5—5 of Fig. 1, showing the brake anchor.

The brake includes generally a central shoe 10 anchored at 12, a servo end shoe 14 pivoted to the central shoe by a pin 16, and a reverse end shoe 18 which may be anchored directly at its end as in Dodge Patent 1,567,-716 but preferably is anchored by a pivot connection 20 on shoe 10. Shoes 14 and 18 are forced apart to apply the brake by a double cam 22 or the like, against the resistance of return springs 24 and 26.

Shoe 10 is preferably channel-shaped, with parallel spaced flanges 28 and 30 between which extend the ends of shoes 14 and 18, thus securing the desired over-lapping of the shoes. Each of shoes 14 and 18, which may be identical and interchangeable if desired, is formed of two L-section stampings rivetted or otherwise secured back to back to form a T-section shoe having lining-supporting flanges 34 and central stiffening webs 36.

In the ends of webs 36 a bushing 38 is pressed to extend on opposite sides of the shoe and to receive pivot pin 16 (or 20). Each of the flanges 28 and 30 has an opening into which a bushing 40 is pressed, bushings 40 extending inwardly to embrace bushing 38 between them and position shoe 14 (or 18) laterally.

At its unanchored end, the flanges 28 and 30 of shoe 10 are comparatively low, sloping to a greater height at the pivot 16, thus permitting the friction part of shoe 14 to be closely adjacent the end of shoe 10. Anchor 12 passes through a relatively large opening in shoe 18, and does not interfere with the movement of that shoe.

While one illustrative embodiment has been described in detail, it is not my intention to limit the scope of the invention to that particular embodiment, or otherwise than by the terms of the appended claims.

I claim:

1. A brake including a pair of jointly-operable shoes, one of channel form and the other T-shaped in cross-section and extending a substantial distance into the channel of the first.

2. A brake including a pair of shoes, one of channel form and the other T-shaped in cross-section and extending a substantial distance into the channel of the first, together with an anchor for one of the shoes extending through a relatively large opening in the radially-extending portion of the other.

3. A brake including a pair of shoes, one of channel form and the other T-shaped in cross-section and extending a substantial distance into the channel of the first, together with an anchor for one of the shoes extending through a relatively large opening in the radially-extending portion of the other and a pivot connection between the anchored shoe and the end of said other shoe.

4. A brake including a drum and a pair of shoes, one of channel form and the other T-shaped in cross-section and extending a substantial distance into the channel of the first, torque-taking means at the end of each shoe, the means for each shoe being between the ends of the other shoe and means for forcing the pair of shoes against the drum for retarding action at the same time.

5. A brake including a pair of jointly-operable shoes, one of channel form and the other T-shaped in cross-section and extending a substantial distance into the channel of the first and an anchor for the end of one of the shoes between the ends of the other shoe.

6. A brake including a pair of jointly-operable shoes, one of channel form and the other T-shaped in cross-section and extending a substantial distance into the channel of the first and an anchor for the end of the channel shoe between the ends of the T-section shoe.

7. A brake including a pair of pressed-metal shoes, one having cylindrical lining-carrying portions integral with stiffening webs between its edges, and the other being of channel form with side flanges straddling the stiffening webs of the first shoe at one end.

8. A brake including a pair of pressed-metal shoes, one having oppositely-extending cylindrical lining-carrying portions and central stiffening webs, and the other being of channel form with side flanges straddling the stiffening webs of the first shoe at one end.

9. A brake including a drum, a central shoe having substantially parallel spaced flanges at least at its ends, a pair of end shoes of T-section at least at their ends and extending between the spaced flanges at opposite ends of the central shoe, and means for forcing the central shoe and the two end shoes against the drum at the same time.

10. A brake including a drum, a central shoe having substantially parallel spaced flanges throughout, a pair of end shoes T-section extending between the spaced flanges at opposite ends of the central shoe, and means for forcing the central shoe and the two end shoes against the drum at the same time.

11. A brake including a channel-shaped central shoe and T-section shoes extending into oposite ends of the channel of the central shoe, together with an anchor for the side flanges at one end of the central shoe and between the ends of the corresponding end shoe and pivot connections between the ends of the end shoes and the side flanges of the central shoe.

12. A brake including a channel-shaped shoe having bushings pressed into openings in its side flanges, a shoe having a part extending between said flanges and having a bushing pressed into an opening in alinement with the two side bushings, and a connecting pin extending through the three bushings, the central bushing extending outwardly on both sides of its shoe and the two side bushings extending inwardly from the side flanges and embracing the central bushing between them to confine the second shoe laterally.

13. A brake including an intermediate shoe having spaced flanges at least at its ends, shoes extending between the flanges at opposite ends of the intermediate shoe, and means for connecting the intermediate shoe at its ends to the other shoes.

14. A brake including a channel-section intermediate shoe, shoes extending into the opposite ends of the channel of the intermediate shoe, and means for connecting the ends of the intermediate shoe to the other shoes.

15. A brake including an intermediate shoe having spaced flanges at least at its ends, other shoes extending between the flanges at opposite ends of the intermediate shoe, and brake-applying means acting on the intermediate shoe through both of said other shoes.

16. A brake comprising a connected assembly of shoes, including an intermediate shoe having spaced flanges at least at its ends, and other shoes extending between said flanges and connected to the intermediate shoe.

17. A brake comprising a connected assembly of shoes, including an intermediate shoe having spaced flanges at least at its ends, and other shoes extending between said flanges and connected to the intermediate shoe, together with means for taking the torque of all of the shoes adjacent one end of the intermediate shoe.

18. A brake including a shoe anchored at one end and having spaced flanges at least at its anchored end, and another shoe extending between the spaced flanges and connected to the anchored shoe some distance from its anchored end.

In testimony whereof, I have hereunto signed my name.

LUDGER ELIZE LA BRIE.